May 20, 1930.    J. M. LUCARELLE ET AL    1,759,654
PHONOGRAPH
Filed Aug. 13, 1924     4 Sheets-Sheet 1

INVENTORS
JOSEPH M. LUCARELLE & JOHN E. RENHOLDT
BY Arthur C. Johnson
ATTORNEY

May 20, 1930.  J. M. LUCARELLE ET AL  1,759,654
PHONOGRAPH
Filed Aug. 13, 1924  4 Sheets-Sheet 2

INVENTORS
JOSEPH M. LUCARELLE & JOHN E. RENHOLDT
BY
ATTORNEY

May 20, 1930. J. M. LUCARELLE ET AL 1,759,654
PHONOGRAPH
Filed Aug. 13, 1924  4 Sheets-Sheet 3

INVENTORS
JOSEPH M. LUCARELLE & JOHN E. RENHOLDT.
BY
ATTORNEY

May 20, 1930.  J. M. LUCARELLE ET AL  1,759,654

PHONOGRAPH

Filed Aug. 13, 1924  4 Sheets-Sheet 4

INVENTORS
JOSEPH M. LUCARELLE & JOHN E. RENHOLDT,
BY
ATTORNEY

Patented May 20, 1930

1,759,654

UNITED STATES PATENT OFFICE

JOSEPH M. LUCARELLE, OF BRIDGEPORT, AND JOHN E. RENHOLDT, OF STRATFORD, CONNECTICUT, ASSIGNORS TO DICTAPHONE CORPORATION, OF BRIDGEPORT, CONNECTICUT, A CORPORATION OF NEW YORK

PHONOGRAPH

Application filed August 13, 1924. Serial No. 731,795.

This invention relates to dictating machines and in a more specific aspect, to dictating machines of the transcriber type.

An object of the invention is to facilitate operation of the device, to improve its performance and to decrease the assembling cost of the device.

In the accompanying drawings, which illustrate one embodiment of this invention.

Figure 1:
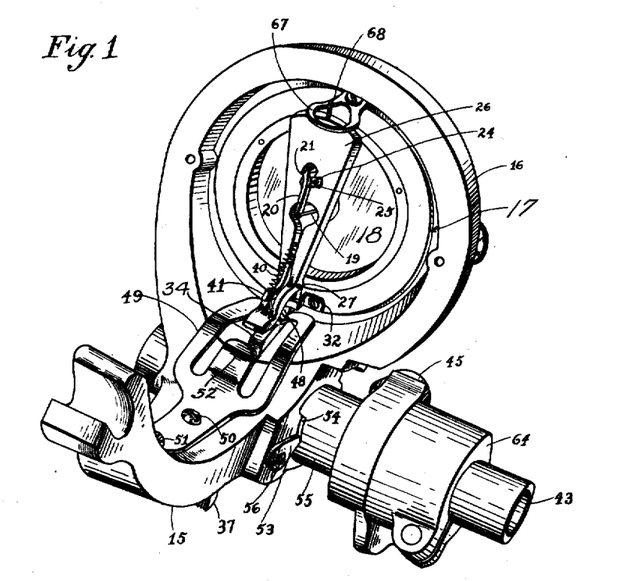
Figure 1 is a perspective view showing the carriage of a transcribing machine and certain features of the present invention in detail.
Figure 2:
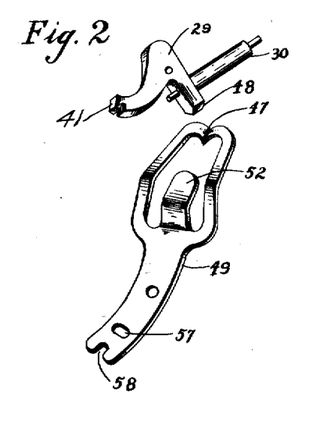
Fig. 2 is a detail perspective view of parts of the mechanism shown in Fig. 1.
Figure 3:
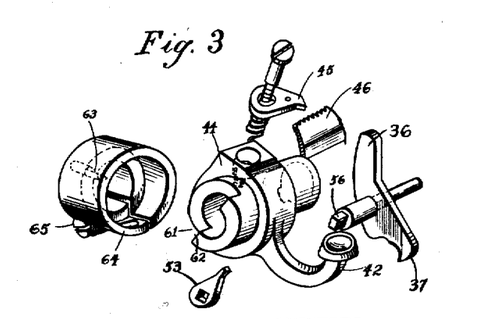
Fig. 3 is a disassembled perspective view of parts of the back-space mechanism shown in Fig. 1.
Figure 4:
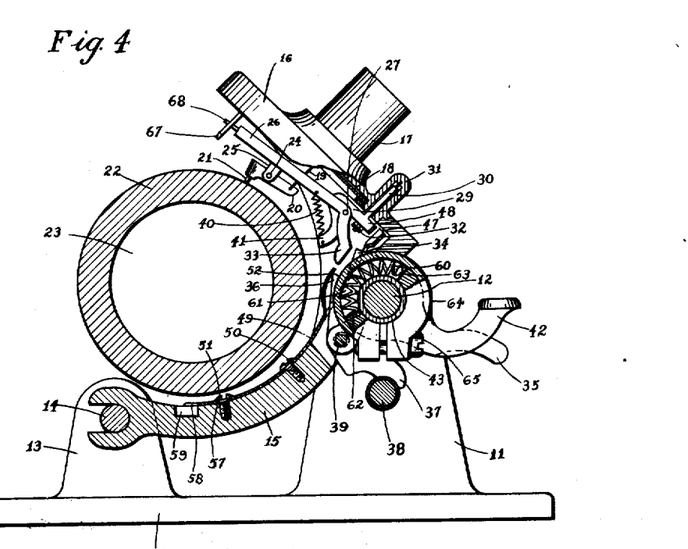
Fig. 4 is a side elevation, partly in section, of a carriage for a transcribing machine, showing the invention embodied therein.
Figure 5:
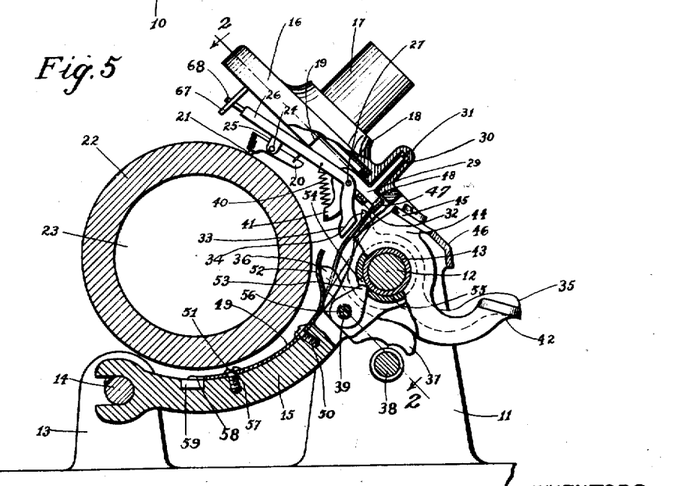
Fig. 5 is a view similar to Fig. 4, but shows the parts in operated positions.

The phonographic machine shown in the accompanying drawing for the purpose of illustrating this invention, is a transcribing machine and, as may be seen in Fig. 4, comprises a base 10 having upstanding arms 11 adapted to carry a front guide-rod 12 and arms 13 adapted to carry a rear guide-rod 14. Slidably mounted upon the guide-rods 12 and 14 is a carriage 15 having a head 16 adapted to support the sound-box 17 for reproducing the sound recorded on a record.

The sound-box 17 is provided with a diaphragm 18 connected by a wire 19 to a lever 20 carrying on its rearward arm a ball-shaped stylus 21 which engages the record 22 carried by a mandrel 23.

For the purposes of allowing the stylus to move to and from the record to accommodate itself to records of different thicknesses, the stylus lever 20 is pivoted at 24 upon arms 25 carried by a lever 26, which has a horizontal pivot 27. The wire 19 connects the end of the stylus-lever 20 with the diaphragm and maintains a connection between the diaphragm and the stylus-lever in all positions of the latter with respect to the former.

To allow the stylus 21 to freely track the record, that is, follow the grooves of the record, the horizontal pin 27 of the lever 26 is mounted upon a bracket or support 29 provided with a vertically disposed pivot 30 mounted on the sound-box casing 16. The pivot 30 is located at right angles to the pivot 27 and allows the lever 26 with its stylus-lever 20 to swing laterally in following the grooves of the record. The upper end of the pivot 30 has a bearing in a housing 31 on the head 16 to receive it, and the lower end is held by a bracket 32 secured to the sound box casing.

In addition to the function above described, the horizontal pivot 27 of the lever 26 allows the lever with the stylus-lever and stylus to be raised from record-engaging position. For the purpose of doing this, when the sound-box carriage 15 is to be moved for any large extent over the record, and when it is desired to remove the record from the machine and place another record upon the machine, the lever 26 is provided with an arm 33 adapted to be engaged by an arm or projection 34 of a releasing lever 35.

Figure 11:
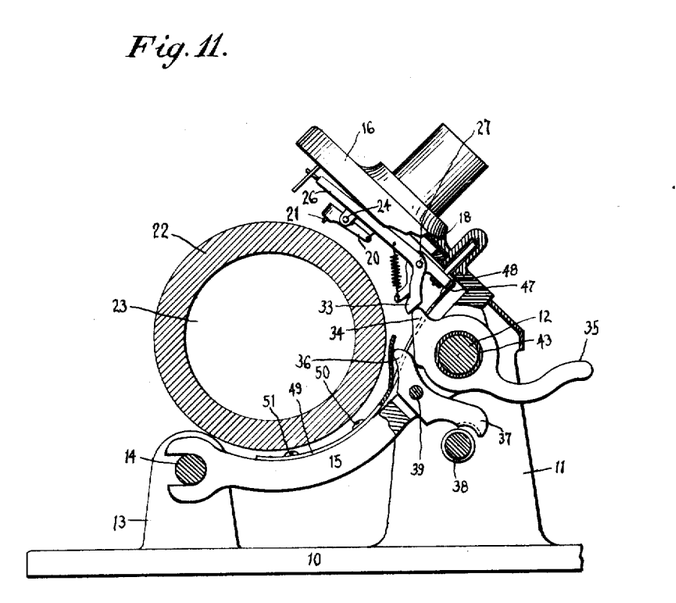
Fig. 11 is a side view, partly in section, and shows the releasing lever in position raising the stylus from the record and disengaging the feed-nut from the feed-screw.

This releasing lever 35 is so arranged that when its forward end is raised, its rearward arm 34 engages the arm 33 of the lever 26 carrying the stylus-lever and raises the stylus from the record surface. At the same time, the arm 34 of the releasing lever engages an arm 36 forming part of a feed-nut 37 which engages a feed-screw 38 of the carriage feeding mechanism. The nut 37 is pivotally mounted on the frame of the carriage 15 at 39 so that when its arm 36 is rocked rearwardly by the operation of the carriage releasing lever 35, the nut 37 will be raised from engagement with the screw shaft 38, as shown in Fig. 11. When the releasing lever 35 is released and allowed to move to its lower position, the lever 26 is allowed to fall, due to its own weight and assisted by a spring 40, until the stylus engages the record. This spring 40 is connected at one end to the lever 26 and at the other end to a downwardly extending ear 41 of the support 29 which carries the lever 26 for horizontal rocking or tracking movements. This means for releasing the feed nut and raising the stylus is shown and described more fully in the patent to MacDonald No. 1,030,740, June 25, 1912, to which reference may be had for a more complete explanation.

To move the carriage backwardly a small extent, as when it is desired to repeat the dictation just heard to verify it, the carriage is moved by back-space mechanism comprising a back-space lever 42. This lever is mounted upon a tubular bearing 43 secured in the carriage 15, and is provided at its top portion with a lug 44 pivotally carrying a pawl 45. When the back space lever 42 is operated, the pawl 45 engages a rack 46 secured to the forward arms 11 and forces the carriage backwardly a predetermined amount. To back space the carriage in excess of this amount, the back-space lever 42 is repeatedly operated.

According to this invention, this back spacing movement of the carriage 15 is effected without causing the stylus 21 to be raised from and then dropped upon the record surface, which operation produces in the operator's ears a loud and unpleasant noise. Therefore, the back-space lever 42 is not, as heretofore, arranged so as to raise the stylus 21 from the record surface during the back-spacing operation. Because of its freedom of lateral movement heretofore, the stylus would not necessarily follow the carriage in its movement, but instead would lag behind the carriage and thus would not be back-spaced at all. However, this disadvantage has been overcome by the present invention by providing means for holding the stylus in a predetermined position during back-spacing operations, without, however, raising the stylus from the record surface.

This means, as shown in Figs. 1 to 5 inclusive, comprises a detent or catch 47 which is V-shaped to engage a companion lug 48 provided on the member 29 which carries the lever 26 for horizontal or tracking movement about the vertical pivot 30. The catch or detent 47 is preferably, but not necessarily, formed integral with a spring-member 49 mounted on the carriage 15 and adapted to be held against movement by screws 50 and 51. Substantially midway between the screw 50 and the catch 47 the spring 49 is provided with an outwardly extending arm 52 by means of which the spring 49 may be operated to move the catch 47 into engagement with the lug 48.

This arm 52 of the catch-carrying spring 49 is preferably operated by the arm 36 of the nut 37, since the latter is as usual removed from the feed-screw 38 during the back-spacing movements of the carriage to allow the carriage to move backwardly. This is accomplished by providing the nut 37 with an arm 53 adapted to engage a notch 54 provided in a sleeve 55 secured to the back-space lever 42, and adapted to turn upon the sleeve 43 secured to the carriage 19. The arm 53 is connected to the nut 37 by means of a squared shoulder 56 formed upon the pivot 39 for the nut.

When the back-space lever 42 is depressed to retract the carriage 15, the arm 36 is rocked rearwardly, rocking the nut so as to remove it from the feed-screw 38. At the same time the upper end of the arm 36 engages the arm 52 of the spring, moving the spring so that the catch 47 engages the V-shaped lug 48 on the member 29 which carries the lever 26 to hold the latter in predetermined centralized position with respect to the diaphragm while the stylus rides over the record-surface.

It should be noted that the catch 47 and lug 48 are entirely out of engagement with each other at all times except when back-spacing. Hence, these parts do not interfere with the regular and proper tracking of the record by the stylus.

Accurate adjustments between the catch 47 and the nut arm 36 are preferably effected by bending the arm 52 of the spring either toward or from the arm 36; a simple and inexpensive operation.

For the purpose of adjusting the lateral position of the detent or catch 47 with respect of the V-shaped lug 48 on the member 29 which it engages, so that the relocation of the stylus will be truly central with respect of the diaphragm, to avoid so refining the processes of manufacture of the device as to render its production prohibitive, the entire spring 49 is adjustable about the screw 50. The screws 50 and 51 are both loosened during the adjusting operation and when securely tightened hold the spring 49 against shifting on the carriage 15. The spring 49 is preferably slotted at 57 to allow arcuate movement of the spring about the screw 50 when the adjustment is being made. To facilitate movement of the spring during the adjusting operation, its lower end is provided with a notch 58 directly above a notch or aperture 59 in the carriage frame 15. A screw driver blade or other similar tool may be inserted in the notch 59 through the notch 58 of the spring and turned, thereby turning the spring 49 upon the pivot screw 50. In this way very fine adjustments can be effected with ease and facility, and it is not necessary in the manufacture of the device, to so reduce the tolerances that the cost of the device would be excessive if not prohibitive.

Lateral movement of the stylus lever 26 is limited beyond the range of free tracking movement by a guide 67 mountd on the carriage and which is engaged by a pin 68 carried by the lever 26.

Instead of providing means for centralizing the stylus each time the carriage is back-spaced such as is shown in Figs. 1 to 5, the machine may be provided with means for automatically and rigidly holding the stylus on the carriage during the back-space movement in whatever position it may have assumed before the back-spacing operation commenced. This may be done so that, irrespective of the position of the stylus with regard to the diaphragm at the start, the stylus will be back-spaced a predetermined amount at each and every back-spacing operation.

Figure 6:
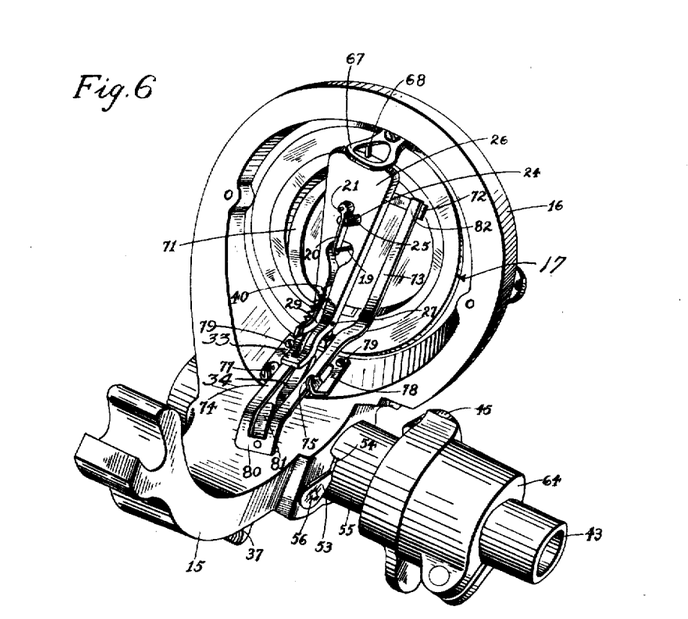
Fig. 6 is a perspective view similar to Fig. 1, but showing another embodiment of this invention.
Figures 7, 8:
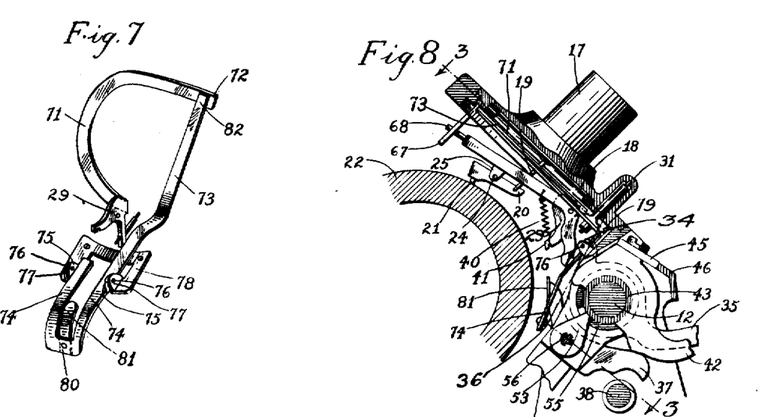
Fig. 7 is a detail perspective view showing several of the parts shown in Fig. 6.
Fig. 8 is a side view partly in section of the embodiment of the invention shown in Fig. 7.

One means for accomplishing this result is disclosed in Figs. 6, 7 and 8 in which figures the parts which are the same as in Figs. 1 to 5, have the same reference numerals. In this case the brackets or support 29 is provided with an arm 71 curved to extend around the wire 19 connecting the stylus lever and the diaphragm, so that its end 72 will be as far as it is conveniently possible from the pivot point of the bracket. Coacting with the end 72 of the arm 71 is a lever 73 which extends upwardly and rearwardly from the forward part of the carriage. The lever 73 has a pair of arms 74 each having upturned ears 75 adapted to receive pins 76 which also pass through upturned ears 77 of a bracket 78 adapted to be secured to the carriage at its front end by screws 79. The arms 74 of the lever 73 are inter-connected by a cross-bar 80 to which is secured a spring member 81 which, like the tongue 52 in the form shown in Figs. 1 to 5, is adapted to be engaged by the arm 36 of the feed-nut 37.

When the feed-nut 37 is raised from engagement with the feed-screw 38, the arm 36 engages the spring-member 81 and rocks the arm 74 of the lever 73 rearwardly so that the end 82 of the lever 73 engages the end 72 of the arm 71 forming part of the supporting bracket 29 (See Figs. 7 and 8). The effect of this is to hold the bracket 29 in whatever position it assumes before the feed-nut 37 is removed from the feed-screw 38, and it so holds the bracket and stylus carried thereby during the back-spacing movement which is performed by the pawl 45 which engages the rack 46.

When the back-space key-lever 42 is released, the nut 37 is allowed to re-engage the feed-screw 38 and the lever 73 withdraws its end 82 from engagement with the end 72 of the lever 71 and allows free movement of the bracket 29 during the tracking of the record.

Figure 9:
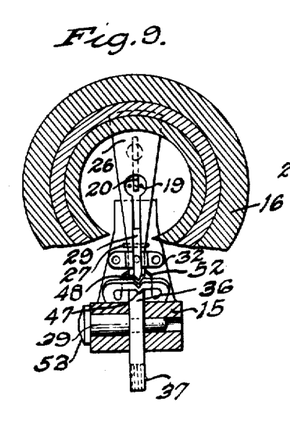
Fig. 9 is a sectional plan view of the form of the invention shown in Figs. 1 to 5 taken on line 2—2 in Fig. 5.
Figure 10:
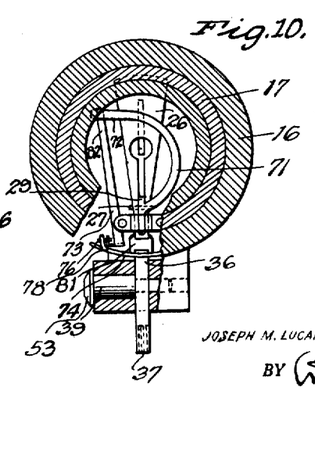
Fig. 10 is a sectional plan view of the form of the invention shown in Figs. 6, 7 and 8 taken on the line 3—3 of Fig. 8.

If desired, the spring member 49 in the form of this invention shown in Figs. 1 to 5 inclusive and in Figs. 9 and 11 may be provided with a flat surface instead of the V-shaped catch 47, so as to hold the stylus in whatever position it assumed before the back-spacing operation commences. However, the the form shown in Figs. 6 to 8 is preferable at present, because by extending the operating part to a substantial distance from the pivot point of the bracket 29, greater leverage is obtained for the purpose of holding the parts against movement while the stylus rises and falls over the record grooves as it is back-spaced.

It will be seen, therefore, that the present invention not only provides means for accurately and certainly centralizing the stylus every time the back-spacer is operated, but also provides means for holding the stylus during the back-spacing operation in whatever position it may have assumed before the back-spacing operation took place.

When the back-space lever 42 is released, it is returned to its normal position by means of a spring 60 located in a cut-out portion 61 of the back-space lever and abutting at one end upon a shoulder 62 on the back-space lever and at the other end against a shoulder 63 provided upon a split collar 64 which is employed to retain the back-space lever with its sleeve 55 upon the sleeve 43 of the carriage. The compression of this spring is effected on the depression of the back-space lever 42, so that when the manual pressure is released from the lever, the spring 60 will return the lever to the position shown in Fig. 4. Heretofore, in similar means for holding the back-space key upon its sleeve the securing collar was made in one piece and its position was determined by means of a set-screw. In such cases it was difficult so to secure the collar upon the sleeve 43 by this means.

The present invention, therefore, provides a split collar, the opposite sides of which may be securely clamped upon the sleeve 43 by the application of a screw 65 connecting the opposite legs of the split collar.

Variations and modifications may be made within the scope of this invention and portions of the improvements may be used without others.

What is claimed as new, and for which it is desired to obtain Letters Patent, is:—

1. A sound-reproducer comprising a record-engaging stylus; means for supporting said stylus capable of allowing the stylus to move along the record surface to properly track the record; and means for automatically and predeterminedly positioning said stylus within its range of tracking movement without removing the stylus from the record.

2. A sound-reproducer, comprising a diaphragm; a record-engaging stylus connected to the diaphragm and having a range of movement relative to the diaphragm in which to track the record; and means for automatically and predeterminedly positioning said stylus within said range of movement, without removing the stylus from the record.

3. A sound-reproducer comprising a diaphragm; a support therefor; a record-engaging stylus connected to the diaphragm and having a range of movement relative to the diaphragm-support in which to track the record; and means for automatically and predeterminedly positioning said stylus within said range of movement without removing the stylus from the record.

4. In combination, a diaphragm; a record-engaging stylus having vibration-transmitting connection to the diaphragm; a carriage; and means for moving the stylus to a predetermined position with respect of the carriage without moving the stylus from the record.

5. In a dictation machine, a carriage; a reproducing stylus mounted in the carriage and having tracking freedom of movement relative to the carriage along a grooved record-surface; means for back-spacing the carriage; and means for causing the stylus to back-space simultaneously with the carriage over the record-surface and while continually engaged therewith.

6. In a dictation machine, a carriage; a reproducing stylus mounted in the carriage and having tracking freedom of movement relative to the carriage along a grooved record-surface; means for back-spacing the carriage; and means for rendering the stylus incapable of tracking freedom of movement during the operation of the back-spacing means, the stylus traveling over, but remaining in engagement with, the record-surface during back-spacing movements of the carriage.

7. In a dictation machine, a carriage, a stylus mounted in the carriage and having tracking freedom of movement relative to the carriage along a grooved record-surface; means for back-spacing the carriage; and means for clamping said stylus against tracking freedom of movement during the operation of the back-spacing means.

8. In a dictation machine, a carriage; a stylus mounted in the carriage and having tracking freedom of movement relative to the carriage along a grooved record-surface; means for back-spacing the carriage; and adjustable means for holding the stylus in predetermined position with respect to the carriage during back-space movements of the latter, the stylus remaining in engagement with the record-surface during back-spacing movements and riding over the grooves of the record-surface.

9. In a dictation machine, a carriage; a stylus mounted in the carriage and having tracking freedom of movement relative to the carriage along a grooved record-surface; means for back-spacing the carriage; and means for holding the stylus in predetermined position with respect to the carriage during back-space movements of the latter, the stylus remaining in engagement with the record-surface during back-spacing movements and riding over the grooves of the record-surface.

10. A sound-reproducer comprising a record engaging stylus; means for supporting said stylus capable of allowing the stylus to move relative to its support to properly track the record; and means for supporting the stylus against such freedom of movement at a predetermined time.

11. A sound-reproducer comprising a diaphragm; a support therefor; a record engaging stylus connected to the diaphragm and having a range of movement relative to the diaphragm-support in which to track the record; and means for holding said stylus against such movement, at a predetermined time.

12. In combination, a diaphragm; record-engaging means having vibration transmitting connection to the diaphragm; a carriage; and means for holding the record-engaging means in a predetermined position with respect to the carriage and diaphragm, at a predetermined time.

13. In a dictating machine, a carriage; a stylus mounted on the carriage and having tracking freedom of movement on a grooved record-surface; means for back-spacing the carriage; and means for holding the stylus against such freedom of movement on the carriage during the operation of the back-spacing means.

14. In combination, a frame; a sound-box carriage mounted on said frame; a record-engaging stylus mounted in said carriage and capable of record-tracking movement relative to said carriage; means for back-spacing the carriage while allowing the stylus to remain in engagement with the record; and means operated by the last-named means for holding the stylus against the said record-tracking movements in the carriage during the back-spacing movement of the carriage.

15. In combination, a frame; a sound-box carriage mounted on the frame; a record-engaging stylus mounted in the carriage and capable of record-tracking movements relative to the carriage; a lever for back-spacing the sound-box carriage while allowing the stylus to remain in engagement with the record; stylus position controlling means; and means comprising a resilient member and operated by said lever for actuating the stylus position controlling means.

16. In combination, a frame; a sound-box carriage mounted in the frame; a record-engaging stylus mounted in the carriage and capable of record-tracking movements relative to the carriage; means for back-spacing the sound-box carriage while allowing the stylus to remain in engagement with the record; and a clamping device comprising companion parts, one of which is connected to the stylus and mounted for movement with the stylus in its record-tracking movements, and the other of which is fixed against said tracking movement, said parts upon engagement with each other being adapted to hold the stylus against tracking movement.

17. In combination, a frame; a sound-box carriage mounted in the frame; a record-engaging stylus mounted in the carriage and capable of record-tracking movements relative to the carriage; means for back-spacing the sound-box carriage while allowing the stylus to remain in engagement with the record; a clamping device comprising companion parts, one of which is connected to the stylus and mounted for movement with the stylus in its record-tracking movements, and the other of which is fixed against said tracking movements, said parts upon engagement with each other being adapted to hold the stylus against tracking movements; and means operated by the back-spacing means for causing said parts to engage during back-spacing movements of the carriage.

18. In combination, a frame; a sound-box carriage mounted on the frame; a record-engaging stylus mounted in the carriage and capable of record-tracking movements relative to the carriage; means for back-spacing the sound-box carriage while allowing the stylus to remain in engagement with the record; a clamping device comprising companion parts, one of which is connected to the stylus and mounted for movement with the stylus in its record-tracking movements, and the other of which is fixed against said tracking movements, said parts upon engagement with each other being adapted to hold the stylus against tracking movement; and means comprising a resilient member and operated by the back-spacing means for causing said parts to engage during the back-spacing movements of the carriage.

19. In a phonograph, the combination of a support for a record; sound reproducing means comprising a stylus mounted for a range of free lateral movement in which to track the record; means for shifting said stylus backwardly towards the beginning of the record by causing the same to skid or glide over the surface of the record; and means actuated independently of the bodily movement of said sound-reproducing means and operated by the means for shifting the stylus backwardly for causing the stulus to be in a central position in said range of free lateral movement upon completion of back-spacing movements.

20. In a phonograph, the combination of a support for a record; sound-reproducing means comprising a stylus mounted for a range of free lateral movement in which to track the record; means for shifting said stylus backwardly towards the beginning of the record by causing the same to skid or glide over the surface of the record; and means actuated independently of the bodily movement of the sound-reproducing means and operated by the means for shifting the latter backwardly for causing the stylus to assume a predetermined position in said range of free lateral movement, said position being determined previously by the location of this last-named means with relation to the sound-reproducing means.

21. In a phonograph, the combination of a support for a record; sound-reproducing means comprising a stylus mounted for a range of free lateral movement in which to track the record; means for shifting said stylus backwardly towards the beginning of the record by causing the same to skid or glide over the surface of the record; and means actuated independently of the movement of the sound-reproducing means and operated by the means for shifting the latter backwardly for causing the stylus to assume a predetermined position in said range of free lateral movement, said predetermined position being controlled by the location of the last-named means with relation to the sound-reproducing means and said last-named means being adjustable to vary the location of said predetermined position so that upon repeated operation of the stylus returning means said last-named means will cause the stylus to always assume said predetermined position without regard to the position that the stylus occupied before the backward shifting movement of the stylus was effected.

22. In a phonograph, the combination of a support for a record; sound-reproducing means comprising a stylus mounted for a range of free lateral movement in which to track the record; and means adapted to first cause the stylus to assume a central position with relation to the sound-reproducing means and then to shift the stylus backwardly toward the beginning of the record by causing the same to glide or skid over the record surface, said centralizing means operating to shift the stylus without lifting the same from the record.

23. In a dictation machine, the combination of a carriage; record-engaging means carried by the carriage and having tracking freedom of movement relative to the carriage along a record-surface, and freedom of movement relative to the carriage toward and from the record surfaces; means for back-spacing the carriage while allowing the stylus to glide over the record-surface; and means for holding the stylus against tracking freedom of movement and permitting movement of the stylus toward and from the record surface during the back-spacing of the carriage.

24. In a dictation machine, the combination of a carriage; record-engaging means carried by the carriage and having tracking freedom of movement relative to the carriage along a record-surface, and freedom of movement relative to the carriage toward and from the record surface; means for back-spacing the carriage without raising the stylus from the record; and means for causing the stylus to be in a definite and predetermined position relative to the carriage at the completion of the back-spacing operation.

25. In a dictation machine, the combination of a carriage; record-engaging means carried by the carriage and having tracking freedom of movement relative to the carriage along a record-surface, and freedom of movement relative to the carriage toward and from the record surface; means for back-spacing the carriage without raising the stylus from the record; and means for causing the stylus to be in a definite and predetermined position relative to the carriage at the completion of the back-spacing operation, said means permitting movement of the stylus relative to the carriage toward and from the record surface during backward gliding movement thereof over the record-surface.

Signed at Bridgeport, in the county of Fairfield, and State of Connecticut, this 11th day of August, 1924.

JOSEPH M. LUCARELLE.
JOHN E. RENHOLDT.

CERTIFICATE OF CORRECTION.

Patent No. 1,759,654.                                  Granted May 20, 1930, to

JOSEPH M. LUCARELLE ET AL.

It is hereby certified that error appears in the printed specification of the above numbered patent requiring correction as follows: Page 4, line 104, claim 13, after the word "movement" strike out the word "on" and insert instead "relative to the carriage along"; and that the said Letters Patent should be read with this correction therein that the same may conform to the record of the case in the Patent Office.

Signed and sealed this 22nd day of July, A. D. 1930.

(Seal)                                                                          Wm. A. Kinnan,
                                                                              Acting Commissioner of Patents.

and from the record surfaces; means for back-spacing the carriage while allowing the stylus to glide over the record-surface; and means for holding the stylus against tracking freedom of movement and permitting movement of the stylus toward and from the record surface during the back-spacing of the carriage.

24. In a dictation machine, the combination of a carriage; record-engaging means carried by the carriage and having tracking freedom of movement relative to the carriage along a record-surface, and freedom of movement relative to the carriage toward and from the record surface; means for back-spacing the carriage without raising the stylus from the record; and means for causing the stylus to be in a definite and predetermined position relative to the carriage at the completion of the back-spacing operation.

25. In a dictation machine, the combination of a carriage; record-engaging means carried by the carriage and having tracking freedom of movement relative to the carriage along a record-surface, and freedom of movement relative to the carriage toward and from the record surface; means for back-spacing the carriage without raising the stylus from the record; and means for causing the stylus to be in a definite and predetermined position relative to the carriage at the completion of the back-spacing operation, said means permitting movement of the stylus relative to the carriage toward and from the record surface during backward gliding movement thereof over the record-surface.

Signed at Bridgeport, in the county of Fairfield, and State of Connecticut, this 11th day of August, 1924.

JOSEPH M. LUCARELLE.
JOHN E. RENHOLDT.

CERTIFICATE OF CORRECTION.

Patent No. 1,759,654.                                   Granted May 20, 1930, to

JOSEPH M. LUCARELLE ET AL.

It is hereby certified that error appears in the printed specification of the above numbered patent requiring correction as follows: Page 4, line 104, claim 13, after the word "movement" strike out the word "on" and insert instead "relative to the carriage along"; and that the said Letters Patent should be read with this correction therein that the same may conform to the record of the case in the Patent Office.

Signed and sealed this 22nd day of July, A. D. 1930.

(Seal)

Wm. A. Kinnan,
Acting Commissioner of Patents.